(12) United States Patent
Sample et al.

(10) Patent No.: US 8,056,196 B2
(45) Date of Patent: Nov. 15, 2011

(54) QUICK RELEASE FITTING

(75) Inventors: Angela Sample, Lexington Park, MD (US); Jason Smith, Penrose, NC (US); Gary Bradley, Hendersonville, NC (US); Leon Rhodes, Flat Rock, NC (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 345 days.

(21) Appl. No.: 12/404,602

(22) Filed: Mar. 16, 2009

(65) Prior Publication Data
US 2010/0229357 A1    Sep. 16, 2010

(51) Int. Cl.
*A44B 13/02* (2006.01)
(52) U.S. Cl. .................. 24/601.5; 24/582.11; 24/598.4; 294/82.2
(58) Field of Classification Search ................ 24/598.4, 24/601.5, 582.11; 294/82.2, 82.22, 82.24, 294/82.27
See application file for complete search history.

(56) References Cited

U.S. PATENT DOCUMENTS

| | | | | | |
|---|---|---|---|---|---|
| 48,275 | A | * | 6/1865 | Hamilton | 24/598.2 |
| 116,212 | A | * | 6/1871 | Newcomb | 294/82.2 |
| 343,037 | A | * | 6/1886 | Klinkner | 54/59 |
| 479,026 | A | * | 7/1892 | Smeal | 24/165 |
| 1,233,376 | A | * | 7/1917 | Link | 294/82.33 |
| 3,930,290 | A | * | 1/1976 | Mangels | 114/108 |
| 4,093,293 | A | * | 6/1978 | Huggett | 294/82.33 |
| 4,279,062 | A | * | 7/1981 | Boissonnet | 24/305 |
| RE34,351 | E | * | 8/1993 | Lacey | 119/776 |
| 5,769,475 | A | * | 6/1998 | Tylaska | 294/82.2 |
| 6,421,888 | B1 | * | 7/2002 | Grenga et al. | 24/601.5 |
| 6,832,417 | B1 | * | 12/2004 | Choate | 24/600.1 |
| 6,945,676 | B1 | * | 9/2005 | Scott | 362/396 |

* cited by examiner

*Primary Examiner* — Robert Sandy
*Assistant Examiner* — Tyler Johnson
(74) *Attorney, Agent, or Firm* — Mark O. Glut

(57) ABSTRACT

A quick release fitting including a housing assembly having a main portion and a housing arm extending from the main portion, a locking arm and a locking mechanism. The locking arm has a first locking arm end and a second locking arm end, the first locking arm is rotatably attached to the housing arm. The locking mechanism is disposed within the housing assembly, and communicates with the second locking arm end such the locking arm can be locked or unlocked to the housing assembly. When locked the locking arm is secured to the housing assembly and the housing arm, the locking arm and the housing assembly form a slot, when unlocked the locking arm is not secured to the housing assembly.

5 Claims, 1 Drawing Sheet

QUICK RELEASE FITTING

STATEMENT OF GOVERNMENT INTEREST

Figure 2:
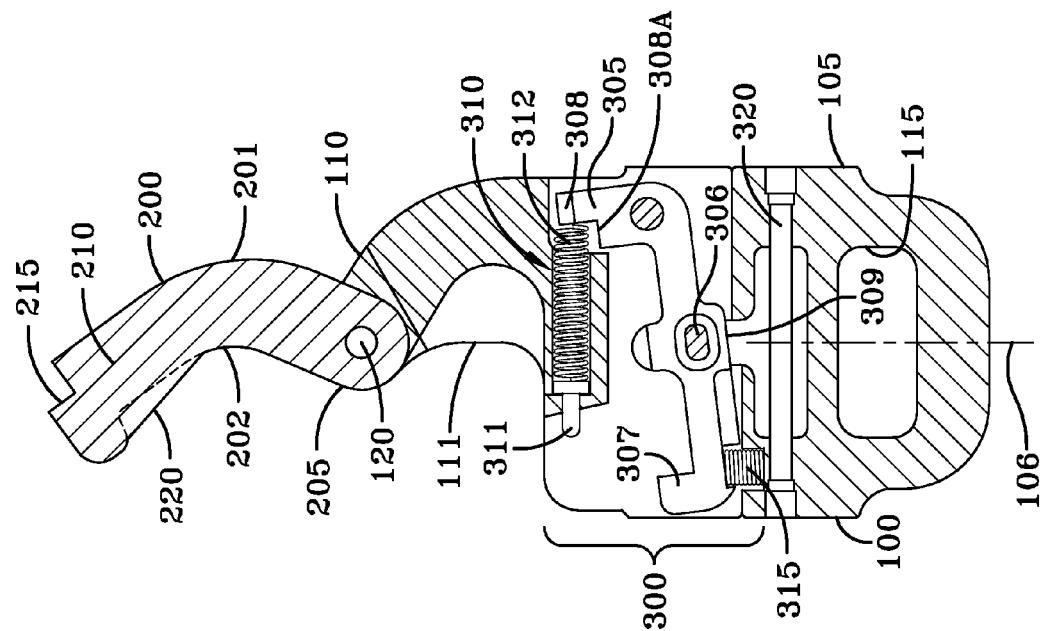

The invention described herein may be manufactured and used by or for the Government of the United States of America for governmental purposes without payment of any royalties thereon or therefor.

BACKGROUND

The present invention relates to a quick release fitting. More specifically, but without limitation, the present invention relates to a common mobile aircrew restraint system interface emergency release assembly.

The United States Navy seeks to improve methods of restraining mobile crew members of air vehicles. Currently, rotary wing mobile aircrew members rely on the Gunner's Belt as the sole means of restraint and protection while flying unseated in aircraft. The Gunner's Belt system has several deficiencies and led to many mishaps including fatalities. These deficiencies include improper loading on the wearer during load events such as a fall or crash, inefficiencies induced to the wearer during mission duties, and limits on reliability of restraint. Those deficiencies have also attributed to several mishaps resulting in fatalities and injuries of aircrew.

The Gunner's Belt is intended to be worn around the chest, although aircrew often wear the belt around the torso and soft organs. Either location is injurious or sometimes fatal when the system is loaded via a fall or crash scenario, as the 3-inch wide webbing of the Gunner's Belt concentrates all the energy to the wearer in areas of low tolerance to force.

With the current Gunner's Belt system, users commonly encounter the problem of inadvertent release of the restraint due to the highly vulnerable latch release device that is exposed about the front torso of the wearer. Any contact with this release device, such as accidental sweeping contact with the aircraft structure, manipulating equipment within the aircraft, or lying on the floor to conduct certain mission duties, could result in inadvertent release of the system. Upon release, not only is the wearer unrestrained, resulting in a major safety hazard, the wearer must interrupt the mission to reconnect, resulting in mission inefficiency and possible mission failure.

The Gunner's Belt system is simply a belt intended to be worn around the chest with an adjustable length of tether that attaches to aircraft structure. This method of restraint has demonstrated limits on reliability. Should a wearer be suspended from the system with arms raised above their head, it is easy to realize the system shortfalls, as the restraint belt can lose all restraint-capability and freeing the wearer from restraint. Furthermore, if the tether is fully extended and the wearer is in a fall or crash scenario, the wearer can be thrown outside the aircraft via cabin doors or windows.

For the foregoing reasons, there is a need for an system described below.

SUMMARY

The present invention is directed to a quick release fitting that meets the needs enumerated above and below.

The present invention is directed to a quick release fitting which includes a housing assembly, a locking arm, and a locking mechanism. The housing assembly has a main portion and a housing arm extending from the main portion. The locking arm is rotatably attached to the housing arm. The locking mechanism is disposed within the housing assembly. The locking mechanism communicates with the locking arm such the locking arm can be locked or unlocked to the housing assembly, when locked the locking arm is secured to the housing assembly, the locking arm, the housing arm and the housing main portion form a slot, when unlocked the locking arm is not secured to the housing assembly.

It is a feature of the present invention to provide a quick release fitting that does not inadvertently release, and has the ability to prevent inadvertent release by snagging or by contacting aircraft or other structures.

It is a feature of the present invention to provide a quick release fitting that can be connected to a nylon lifting harness connect that is attached to the AIRSAVE (CMU-33) survival vest that is worn by aircrew. Together with the quick release and nylon webbing is the common mobile aircrew restraint system AIRSAVE interface. The aircrew interface is a passive system that will become part of the already worn vest and harness assembly, therefore, cannot be worn in an incorrect, unsafe position, like that of a the gunners belt.

It is a feature of the present invention to provide a quick release fitting that is incorporated into a lifting harness that distributes applied loads appropriately through the quick release fitting and into a load-bearing harness, thus increasing the wearer's tolerance to load tremendously. It is a further feature to provide an assembly that has been tested and shown to decrease the chest load by up to 87%, compared to the gunner's belt.

It is a feature of the present invention to provide a quick release fitting with the ability to withstand a statically applied load of 3500-lbf for 60-seconds without permanent deformation, yet retain its other functional requirements.

It is a feature of the present invention to provide a quick release fitting with ability to positively engage itself such that the quick release fitting cannot appear to be engaged when in actuality it is partially engaged or not engaged. It is a feature, proven via testing, that the present invention will not inadvertently release upon crash or fall, like that of the gunner's belt.

It is a feature of the present invention to provide a quick release fitting with the ability to release at 0-lbf tension and 300-lbf tension with a manual pull of less than 27-lbf and more than 15-lbf, after exposure to the applied load requirements.

DRAWINGS

Figure 1:
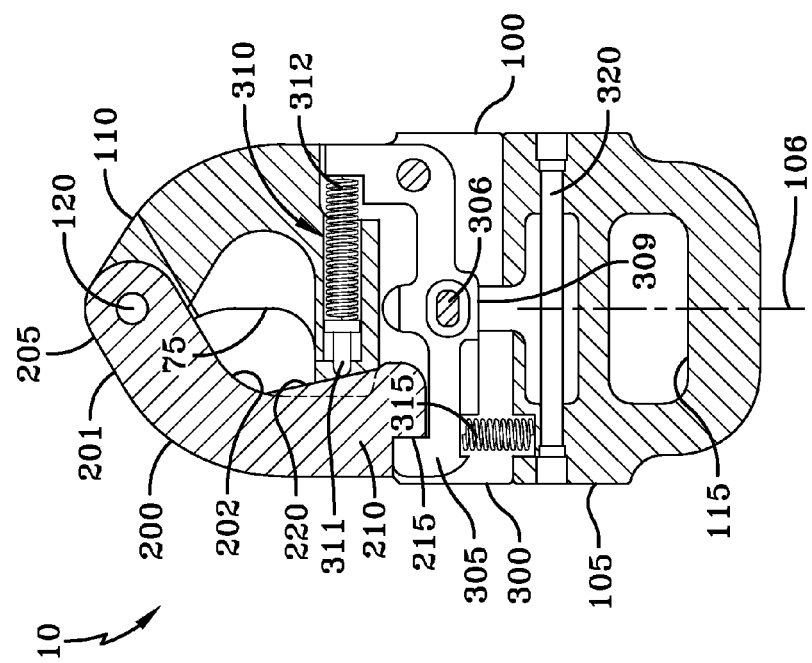

These and other features, aspects and advantages of the present invention will become better understood with reference to the following description and appended claims, and accompanying drawings wherein:

FIG. 1 is side internal view of the quick release fitting in the closed position; and, FIG. 2 is side internal view of the quick release fitting in the open position.

DESCRIPTION

The preferred embodiments of the present invention are illustrated by way of example below and in FIGS. 1 and 2. As shown in FIGS. 1 and 2, the quick release fitting 10 includes a housing assembly 100, a locking arm 200, and a locking mechanism 300. The housing assembly 100 has a main portion 105 and a housing arm 110 extending from the main portion 105. The locking arm 200 has a first locking arm end 205 and a second locking arm end 210, the first locking arm end 205 is rotatably attached to the housing arm 110. The locking mechanism 300 is disposed within the housing assembly 100. The locking mechanism 300 communicates with the second locking arm end 210 such the locking arm 200 can be locked (as shown in FIG. 1) or unlocked (as shown in FIG. 2). When locked, the locking arm 200 is secured to the housing assembly 100 via the locking mechanism 300. In the locked position, the locking arm 200, the housing arm 110 and the housing main portion 105 form a slot 75 enabling attachment of a cord, rope, wire or the like. When unlocked the locking arm 200 is not secured to the housing assembly 100, and the slot 75 is no longer present.

In the description of the present invention, the invention will be discussed in a military environment; however, this invention can be utilized for any type of application that requires use of a quick release fitting.

The housing arm 110 extends from the housing main portion 105 and curves inwardly toward the centerline 106 of the housing main portion 105. The housing assembly 100 may also include a housing slot 115 disposed on the opposite end of the housing arm 110. The housing slot 115 may accept webbing from a restraint system. The housing assembly 100 may include a housing cover which covers the housing assembly 100 and anything disposed within the housing assembly 100.

The locking arm 200 may be rotatably or pivotably attached to the housing arm 110 via a rivet 120, or any type of mechanism that allows rotational communication. The locking arm 200 has a notch 215 at the second locking arm end 210. The locking arm 200 may have a first edge 201 and a second edge 202. When the quick release fitting 10 is closed and the slot 75 is formed, the first edge 201 is outside the slot 75, while the second edge 202 forms part of the inner edge of the slot 75 (along with the inner edge 111 of the housing arm 110). The notch 215 is disposed at the first edge 201 of the locking arm 200. On the second edge 202 there is a sloping portion 220, which slopes toward the second locking arm end 210 and away from the axis of the locking arm 200 (or toward the centerline 106 of the housing main portion 105 when the quick release fitting 10 is in the closed position).

The locking mechanism 300 includes an actuation lever 305, a plunger assembly 310, a compression spring 315 and a spring pin 320. The plunger assembly 310 includes a plunger 311 and a plunger assembly compression spring 312. The actuation lever 305 is rotatably attached to the housing assembly 100 (at a fulcrum point), preferably at the center of the actuation lever 305 (the center of the actuation lever 305 may be defined, but without limitation, as the proximate point in the middle or center of the opposite axial ends of the lever). The actuation lever 305 contains an actuation lever slot 306 enabling attachment or routing of webbing, a cord or a lanyard that when pulled the actuation lever 305 rotates about its fulcrum point. The plunger assembly compression spring 312 is located between the actuation lever 305 and the plunger 311 and serves to control, in conjunction with compression spring 315, the force required to pull the actuator lever 305 resulting with release. The spring pin 320 serves to react the pull force, thus transitioning the pull force to the actuation lever 305. With webbing, cord or lanyard routed through the actuation lever slot 306 in the actuation lever 305 and anchored to the spring pin 320, the force applied to the webbing, cord or lanyard is applied to the actuation lever 305 resulting with rotation of the actuation lever 305.

The actuation lever 305 includes a notch projection 307, a plunger assembly projection 308 and a lever portion 309. The notch projection 307 and the plunger assembly projection 308 are disposed on opposite ends of the lever portion 309. The actuation lever 305 pivots about the axial center of the of the lever portion 309. The plunger assembly projection 308 may include a gain 308A.

The plunger assembly compression spring 312 envelopes part or most of the plunger 311 and serves to control the force required to pull the actuator lever 305 resulting with release. The plunger assembly compression spring 312 is attached to the plunger assembly projection 308, and rests partially in the gain 308A of the plunger assembly projection 308.

In operation, when the locking arm 200 is engaged to be closed, the sloping portion 220 of the locking arm 200 engages the plunger 311. The plunger 311 along with the plunger assembly compression spying 312 pushes on the plunger assembly projection 308, which causes the actuation lever 305 to pivot such that the end with the plunger assembly projection 308 is pushed downward and the end with notch projection 307 goes upward (with force from the compression spring 315) such that the notch projection 307 communicates with the notch 215 of the locking arm 200 such that the locking arm 220 is in the locked position. When a lanyard or cord communicating with the actuation lever slot 306 is pulled, the actuation lever 309 pivots and the end with the notch projection 307 is pushed downward, ending communication with the notch 307 and the quick release fitting 10 is in the unlocked position.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to certain preferred embodiments thereof, other embodiments are possible. Therefore, the spirit and scope of the appended claims should not be limited to the description of the preferred embodiment(s) contained herein.

What is claimed is:

1. A quick release fitting comprising:
   a housing assembly having a main portion and a housing arm extending from the main portion;
   a locking arm having a first locking arm, end and a second locking arm end, the first locking arm end rotatably attached to the housing arm;
   a locking mechanism disposed within the housing assembly, the locking mechanism communicating with the second locking arm end such the locking arm can be locked or unlocked to the housing assembly, when locked the locking arm is secured to the housing assembly and the housing arm, the locking arm and the housing assembly form a slot, when unlocked the locking arm is not secured to the housing assembly, the locking mechanism includes an actuation lever, a plunger assembly, a compression spring and a spring pin, the actuation lever is rotatably attached at its center to the housing assembly, the actuation lever having a notch projection and a plunger assembly projection disposed at opposite ends of the actuation lever, the plunger assembly when actuated by the locking arm communicates with the plunger assembly projection which causes the notch projection to rotate toward the locking arm and the notch projection to engage with the locking arm such that the locking arm is in a locked position, the compression spring communicates with the actuation lever such that the compression spring applies additional force on the actuation lever that causes the notch projection to move toward the locking arm, the spring pin communicating with the actuation lever such that when force is applied to the spring pin the actuation lever rotates and the locking arm is unlocked.

2. The quick release fitting of claim 1, wherein, the housing arm and the locking arm are curved toward each other.

3. The quick release fitting of claim 2, wherein the slot is fitted for a webbing assembly.

4. The quick release fitting of claim 3, wherein the actuation lever further includes an actuation lever slot for a cord, such that when the cord is pulled the spring pin is actuated causing the actuation lever to rotates and cause the locking mechanism to unlock.

5. The quick release fitting of claim of claim 4 wherein the plunger assembly includes a plunger and a plunger assembly compression spring, the plunger assembly compression spring envelopes the plunger.

\* \* \* \* \*